(12) United States Patent
Kohn et al.

(10) Patent No.: US 9,378,561 B1
(45) Date of Patent: Jun. 28, 2016

(54) LAYER SWITCHING IN AN H.264 SCALABLE VIDEO DECODER

(75) Inventors: Leslie D. Kohn, Saratoga, CA (US);
Ellen M. Lee, Saratoga, CA (US); Peter Verplaetse, Redwood City, CA (US)

(73) Assignee: Ambarella, Inc., Santa Clara, CA (US)

( * ) Notice: Subject to any disclaimer, the term of this patent is extended or adjusted under 35 U.S.C. 154(b) by 1258 days.

(21) Appl. No.: 12/796,042

(22) Filed: Jun. 8, 2010

(51) Int. Cl.
*G06T 9/00* (2006.01)
(52) U.S. Cl.
CPC ........................................ *G06T 9/004* (2013.01)
(58) Field of Classification Search
CPC ........................................................ G06T 9/004
See application file for complete search history.

(56) References Cited

U.S. PATENT DOCUMENTS 5,886,736 A * 3/1999 Chen ................................ 348/43

FOREIGN PATENT DOCUMENTS

JP 2009-225190 1/2009 ............... H04N 7/32

OTHER PUBLICATIONS

Chuang, Tzu-Der et al., "Low Bandwidth Decoder Framework for H.264/AVC Scalable Extension", 201 IEEE, pp. 2960-2963.

* cited by examiner

*Primary Examiner* — Mikhail Itskovich
(74) *Attorney, Agent, or Firm* — Christopher P. Maiorana, PC

(57) ABSTRACT

An apparatus comprising a decoder circuit, a memory circuit and a processing circuit. The decoder circuit may be configured to generate a first intermediate signal having a plurality of coefficients of a target layer and a plurality of coefficients of a base layer, in response to an input bitstream. The memory circuit may be configured to (i) store the first intermediate signal and (ii) present (a) a second intermediate signal comprising the plurality of coefficients of the target layer or (b) a third intermediate signal comprising the plurality of coefficients of the base layer. The processing circuit may be configured to (i) switch a plurality of times between the coefficients of the target layer and the coefficients of the base layer while reading a frame from the memory circuit, (ii) transform the coefficients of the base layer into base layer information, (iii) buffer the base layer information, where the base layer information buffered at any time comprises at most a subset of macroblock rows of the frame and (iv) generate an output signal comprising a plurality of target layer samples in response to the second intermediate signal and the base layer information as buffered.

15 Claims, 11 Drawing Sheets

LAYER SWITCHING IN AN H.264 SCALABLE VIDEO DECODER

FIELD OF THE INVENTION

The present invention relates to video processing generally and, more particularly, to a method and/or apparatus for scalable video coding and/or layer switching in an H.264 scalable video decoder.

BACKGROUND OF THE INVENTION

H.264 SVC (Scalable Video Coding) includes spatial scalability (different picture sizes), quality scalability (different bit rates) and temporal scalability (different frame rates). In spatial scalability, video is coded at multiple spatial resolutions. Each spatial resolution is coded as a layer. The data and decoded samples of lower resolutions are used to predict data or samples of higher resolutions to reduce the bit rate when coding higher resolutions.

Referring to FIG. 1, an H.264 SVC decoder 30 is shown handling two layers of spatial scalability. The decoder 30 receives a base layer stream (i.e., BASELAYER_STREAM) and a target layer stream (i.e., TARGETLAYER_STREAM). The BASELAYER_STREAM is then decoded into base layer coefficients (i.e., BASELAYER_COEFFICIENTS) by a H.264 CABAC/CAVLC decoder 34. The TARGETLAYER_STREAM is decoded into target layer coefficients (i.e., TARGETLAYER_COEFFICIENTS) by a H.264 CABAC/CAVLC decoder 40. The BASELAYER_COEFFICIENTS is then presented to a transform stage circuit 32. The circuit 32 transforms the base layer coefficients into base layer information (i.e., BASELAYER_INFORMATION). The BASELAYER_INFORMATION includes information of all macroblocks together with residuals and intra samples of the base layer picture. The BASELAYER_INFORMATION is then stored in a memory 36. The BASELAYER_INFORMATION is then presented to a transform stage circuit 38. The circuit 38 receives both the BASELAYER_INFORMATION and the TARGETLAYER_COEFFICIENTS. The circuit 38 then presents target layer samples (i.e., TARGETLAYER_SAMPLES).

In conventional approaches, hardware typically handles SVC layer by layer. Hardware decodes one layer, collects all necessary information, stores the information into memory and then uses the information for decoding a next layer. After the next layer is decoded, the information is used for the next higher layer. Up to eight layers may be coded in an SVC stream.

In conventional approaches, an H.264 SVC decoder 30 will typically decode the entire BASELAYER_STREAM, acquire all information about the BASELAYER_INFORMATION, and then store the BASELAYER_INFORMATION to the memory 36. Later in the decoding process, the BASELAYER_INFORMATION will be retrieved from memory to decode the TARGETLAYER_STREAM. After the current target layer stream is decoded, the current target layer becomes a base layer for the next layer. Since the BASELAYER_INFORMATION contains all the macroblocks information as well as residuals and intra samples of the entire base layer picture, a significant amount of memory space is needed. Also, if the memory is an external device, a significant amount of bus bandwidth will be needed.

Since this approach uses a large amount of memory for base layer information, implementation on hardware may cause issues. If information is stored on chip memory, chip die size will increase. If information is stored on external memory, system performance will be limited by bus bandwidth.

It would be desirable to implement a chip to decode an H.264 SVC bitstream using a minimal amount of memory.

SUMMARY OF THE INVENTION

The present invention concerns an apparatus comprising a decoder circuit, a memory circuit and a processing circuit. The decoder circuit may be configured to generate a first intermediate signal having a plurality of coefficients of a target layer and a plurality of coefficients of a base layer, in response to an input bitstream. The memory circuit may be configured to (i) store the first intermediate signal and (ii) present (a) a second intermediate signal comprising the plurality of coefficients of the target layer or (b) a third intermediate signal comprising the plurality of coefficients of the base layer. The processing circuit may be configured to (i) switch a plurality of times between the coefficients of the target layer and the coefficients of the base layer while reading a frame from the memory circuit, (ii) transform the coefficients of the base layer into base layer information, (iii) buffer the base layer information, where the base layer information buffered at any time comprises at most a subset of macroblock rows of the frame and (iv) generate an output signal comprising a plurality of target layer samples in response to the second intermediate signal and the base layer information as buffered.

The objects, features and advantages of the present invention include providing a video processing circuit and/or method that may (i) provide layer switching, (ii) be compatible with H.264 scalable video coding, (iii) use a minimal amount of memory space and/or (iv) provide an efficient implementation.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention may provide an implementation to decode H.264 Scalable Video Coding (SVC) bitstreams that use a minimum amount of memory space. Coefficients and macroblock information may be decoded in parallel from different layers. By decoding a predetermined amount of base layer picture macroblock rows for a target layer picture macroblock row, the base layer picture information stored in memory may be significantly reduced. Since the memory space needed to store such information is relatively small, an on-chip memory may be implemented. System performance may be increased by removing the need to access an external memory. The present invention may also provide spatial scalability support in hardware.

Figure 1:
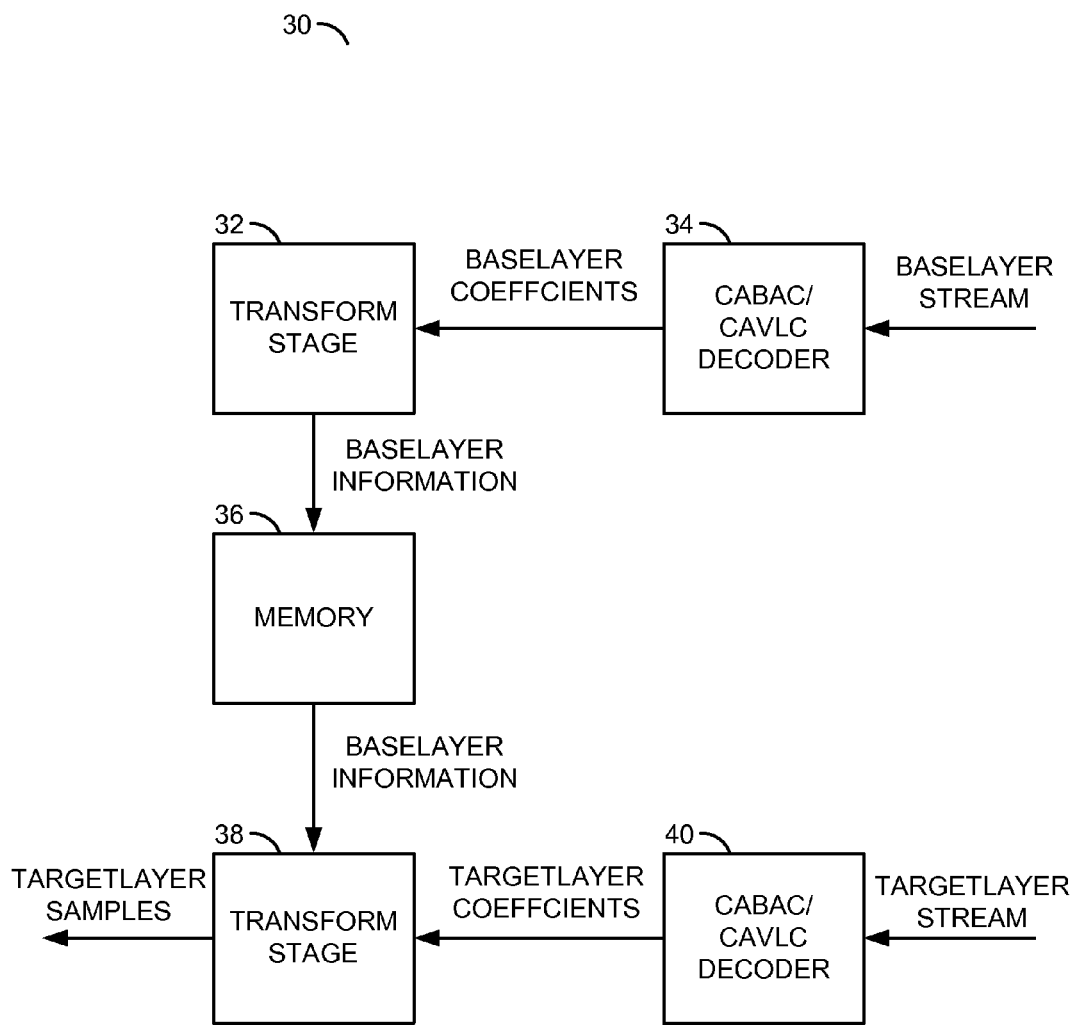
FIG. 1 is a block diagram illustrating a typical H.264 SVC decoder handling two layers of spatial scalability.
Figure 2:
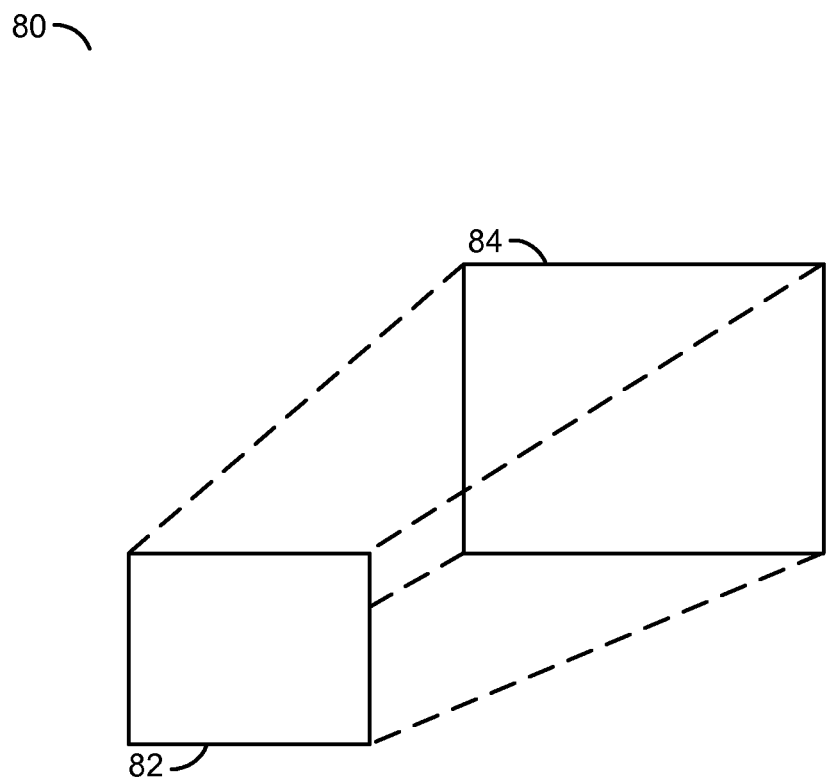
FIG. 2 is a diagram of the spatial scalability between a base layer picture and a target layer picture.

Referring to FIG. 2, a diagram 80 of the spatial scalability between a base layer picture 82 and a target layer picture 84 is shown. The base layer 82 may have a lower resolution than the target layer 84. However, the base layer 82 and the target layer 84 may also have the same resolution. The diagram 80 shows two layers of spatial scalability. However, in the H.264 standard, up to 8 layers of spatial scalability can be implemented.

Figure 3:
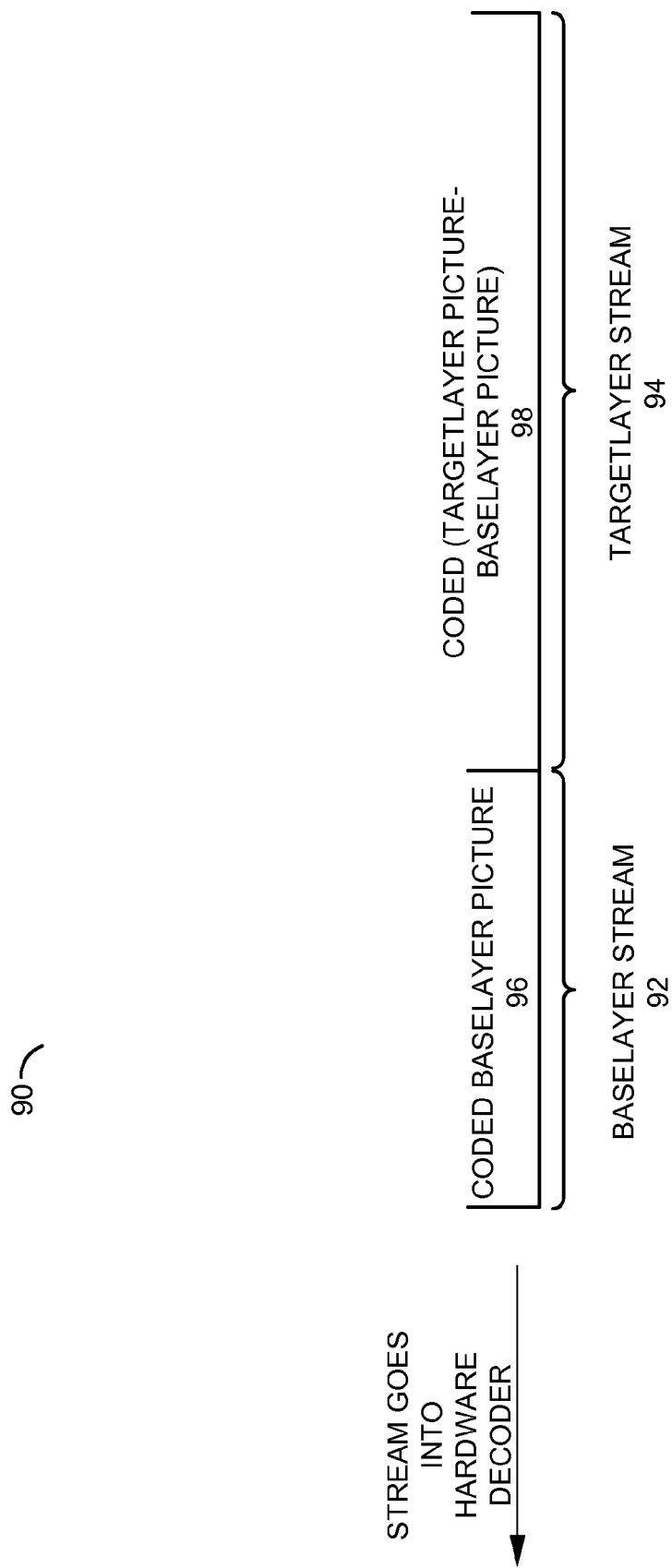
FIG. 3 is a diagram of a bitstream illustrating the coding of two layers of spatial scalability.

Referring to FIG. 3, a bitstream diagram 90 is shown implementing coding of two layers of spatial scalability. A base layer picture and a target layer picture may be coded in the base layer stream 92 and the target layer stream 94. The coded base layer picture 96 may be in the base layer stream 92. The coded (target layer picture-base layer picture) 98 may be in the target layer stream 94. The diagram 90 illustrates a bitstream for two layers of spatial scalability. However, the bitstream may be expanded to more than two layers (to be shown in more detail in connection with FIG. 8).

Spatial scalability may be supported by coding a base layer picture in a base layer stream 92 followed by the differences between a target layer picture and the base layer picture in a target layer stream 94. By decoding the base layer stream 92, the base layer picture 82 may be reconstructed. By decoding both the base layer stream 92 and the target layer stream 94, the target layer picture 84 may be reconstructed. Since the target layer stream 94 normally includes only of the differences between the target layer picture and the base layer picture, both the base layer stream 92 and the target layer stream 94 need to be decoded to construct the target layer picture 84.

Figure 4:
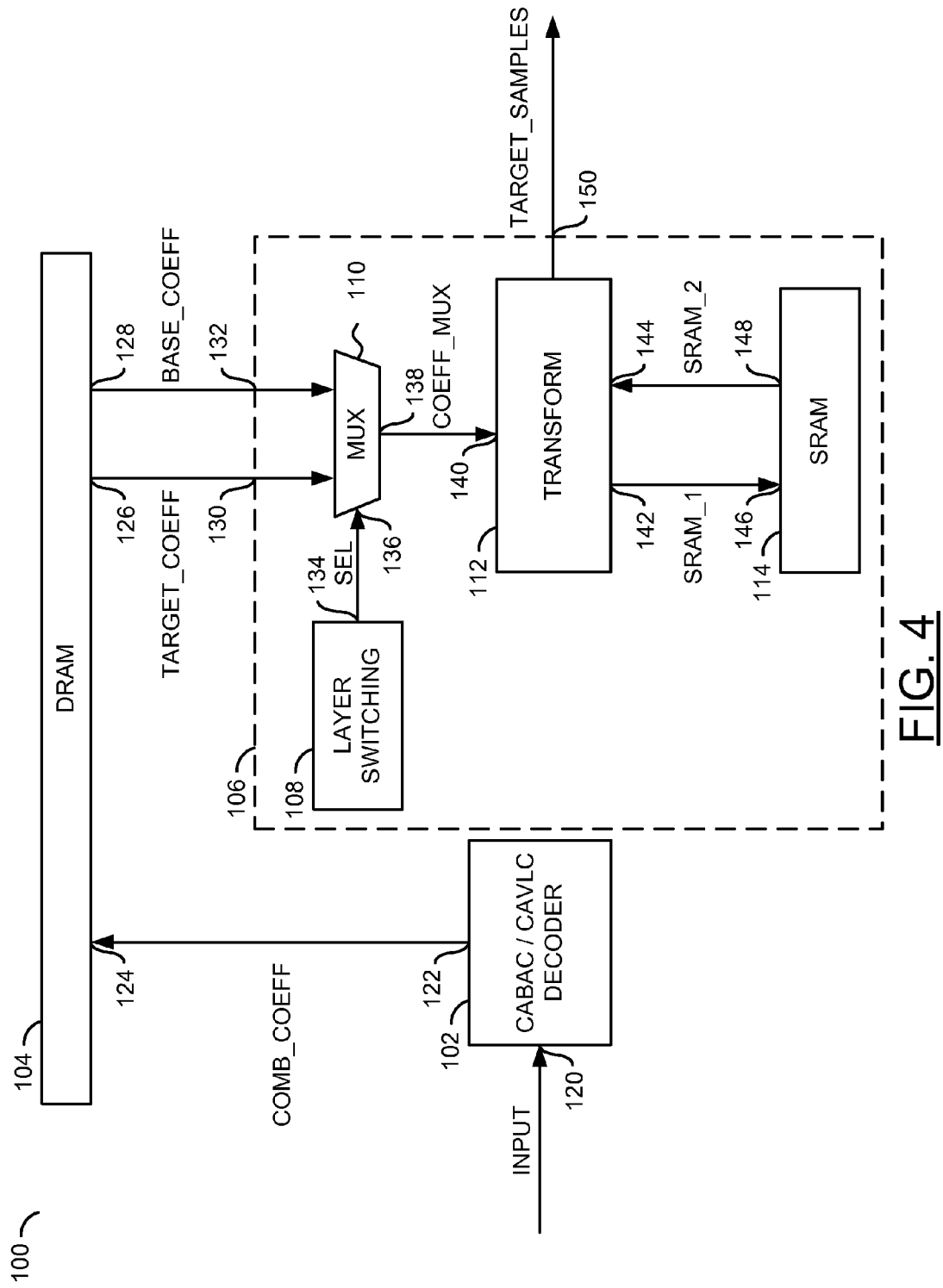
FIG. 4 is a block diagram of the present invention illustrating the decoding two layers.

Referring to FIG. 4, a diagram of a circuit 100 is shown in accordance with a preferred embodiment of the present invention. The circuit 100 may be implemented as an SVC decoder. In one example, the circuit 100 may be compliant with the H.264 SVC specification. However, the circuit 100 may be compliant with other specifications and/or future modifications to the H.264 specification. The circuit 100 generally comprises a block (or circuit) 102, a block (or circuit) 104 and a block (or circuit) 106. The circuit 102 may be implemented as a CABAC/CAVLC decoder circuit. The circuit 104 may be implemented as a memory. In one example, the memory 104 may be implemented as a dynamic random access memory (DRAM). In one example, the memory may be implemented as a static random access memory (SRAM). Additional details of how data is transferred to and from the circuit 104 may be found in U.S. Pat. No. 7,536,487, which is hereby incorporated by reference in its entirety. The circuit 106 may be implemented as a processing circuit.

The circuit 102 may have an input 120 that may receive a signal (e.g., INPUT) and an output 122 that may present a signal (e.g., COMB_COEFF). The circuit 104 may have an input 124 that may receive the signal COMB_COEFF, an output 126 that may present a signal (e.g., TARGET_COEFF), and an output 128 that may present a signal (e.g., BASE_COEFF). In one example, the signal INPUT may be a combined signal that contains a base layer bitstream (e.g., 92) and a target layer bitstream (e.g., 94). In one example, the signal COMB_COEFF may be a signal that includes a combination of the coefficients from the base layer bitstream and the target layer bitstream. In one example, the signal TARGET_COEFF may be the coefficients from the target layer. In one example, the signal BASE_COEFF may be the coefficients of the base layer. The base layer coefficients and the target layer coefficients may be stored and/or retrieved from different addressable areas in the circuit 104.

The circuit 106 may have an input 130 that may receive the signal TARGET_COEFF, an input 132 that may receive the signal BASE_COEFF and an output 150 that may present a signal (e.g., TARGET_SAMPLES). The signal COMB_COEFF may represent one or more base layer coefficients and one or more target layer coefficients. The signal TARGET_COEFF may represent one or more target layer coefficients. The signal BASE_COEFF may represent one or more base layer coefficients.

The circuit 106 generally comprises a block (or circuit) 108, a block (or circuit) 110, a block (or circuit) 112 and a block (or circuit) 114. The circuit 108 may be implemented as a layer switching circuit (to be described in more detail in connection with FIG. 6). The circuit 110 may be implemented as a multiplexer circuit. The circuit 112 may be implemented as a transform circuit. The circuit 114 may be implemented as a static random access memory (SRAM) circuit.

The circuit 108 may have an output 134 that may present a signal (e.g., SEL). The circuit 110 may have an input 130 that may receive the signal TARGET_COEFF, an input 132 that may receive the signal BASE_COEFF, an input 136 that may receive the signal SEL and an output 138 that may present a signal (e.g., COEFF_MUX). The circuit 112 may have an input 140 that may receive the signal COEFF_MUX, an output 142 that may present a signal (e.g., SRAM_1), an input 144 that may receive a signal (e.g., SRAM_2). The circuit 114 may have an input 146 that may receive the signal SRAM_1 and an output 148 that may present the signal SRAM_2. The signals SRAM_1 and SRAM_2 may represent one or more signals presented between the transform circuit 112 and the memory 114. The signals SRAM_1 and SRAM_2 may represent buffered signals. In one example, the signals SRAM_1 and SRAM_2 may represent base layer information.

Figure 10:
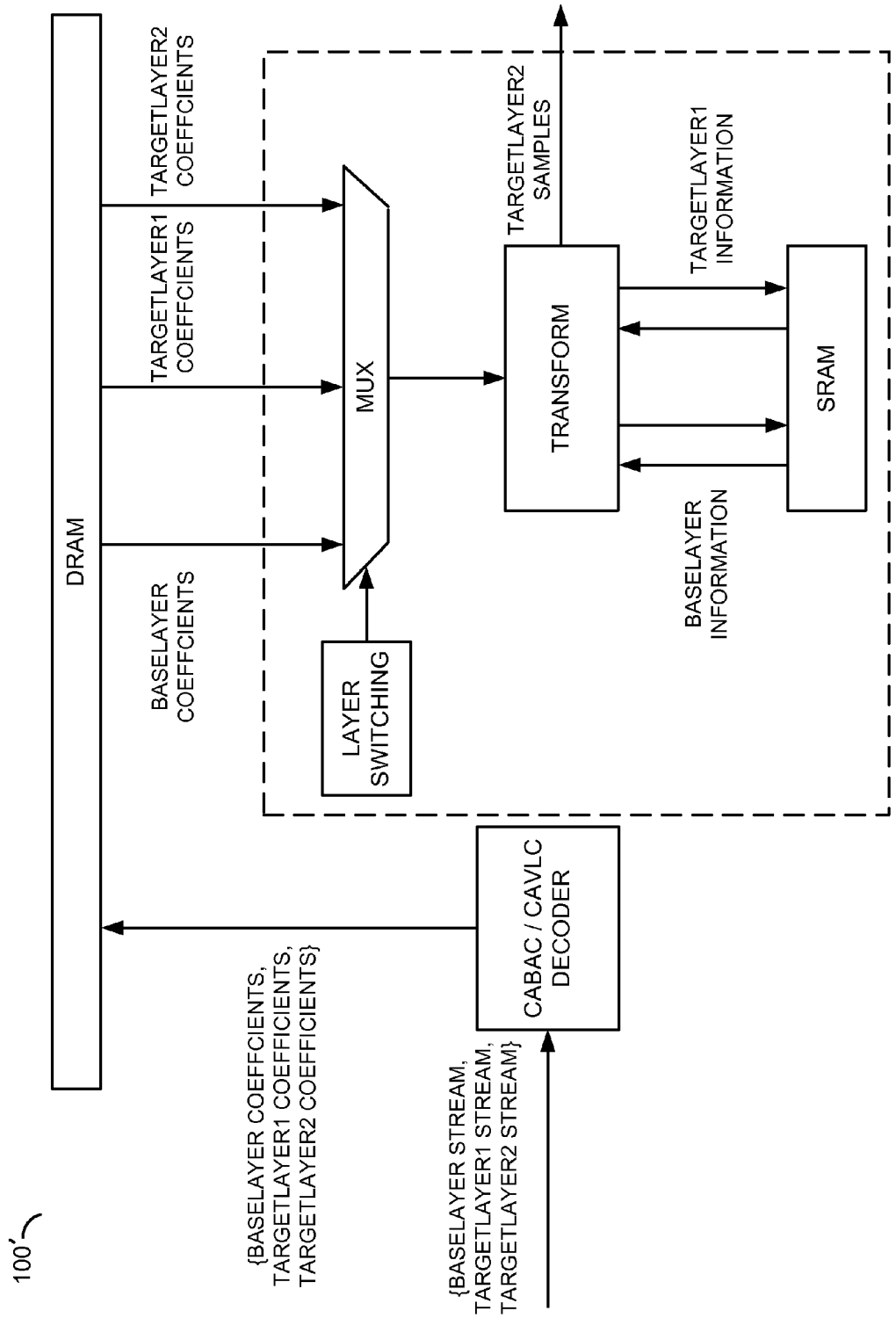
FIG. 10 is a diagram illustrating the present invention decoding three layers.

The circuit 110 may dynamically select either the signal TARGET_COEFF or the signal BASE_COEFF to be presented to the transform stage circuit 112 as the signal COEFF_MUX. The circuit 110 may dynamically generate the signal COEFF_MUX in response to the signal SEL. The circuit 100 illustrates parallel processing of two layers implemented in hardware. However, parallel processing of more than two layers may be implemented. An example of parallel processing of three layers is shown in FIG. 10. The particular number of layers implemented may be varied to meet the design criteria of a particular implementation.

The circuit 100 may minimize the memory space needed during the decoding process by decoding only the necessary picture macroblock rows of the base layer bitstream while still being able to decode a picture macroblock row of a target layer bitstream. The signal INPUT may first be decoded by the decoder circuit 102. The decoded signal COMB_COEFF may then be stored in the memory 104 in corresponding addressable areas. Both the coefficient signal TARGET_COEFF and the coefficient signal BASE_COEFF may later be retrieved from the appropriate addressable areas. The DRAM 104 may store data representing the signals TARGET_COEFF and BASE_COEFF in units of macroblock rows. The layer switching circuit 108 may be used to select between the coefficients based on the row offsets and ratios between the base layer picture and the target layer picture. By minimizing the base layer macroblock rows, the circuit 100 may operate with one target layer macroblock row being decoded. This approach may reduce the memory space of the SRAM 114 needed for processing the signals SRAM_1 and SRAM_2.

The processing circuit 106 may be configured to switch a number of times between the coefficient signal TARGET_COEFF and the coefficient signal BASE_COEFF while reading a frame from the DRAM 104. The coefficient signal BASE_COEFF may be transformed into base layer information by the transform circuit 112. The signals SRAM_1 and SRAM_2 may represent the base layer information. The signals SRAM_1 and SRAM_2 may be buffered. The signals SRAM_1 and SRAM_2 may also comprise at most a subset of macroblock rows of the frame. The output signal TARGET_SAMPLES may be generated in response to the signal TARGET_COEFF and the signals SRAM_1 and SRAM_2 as a buffered signal.

Figure 5:
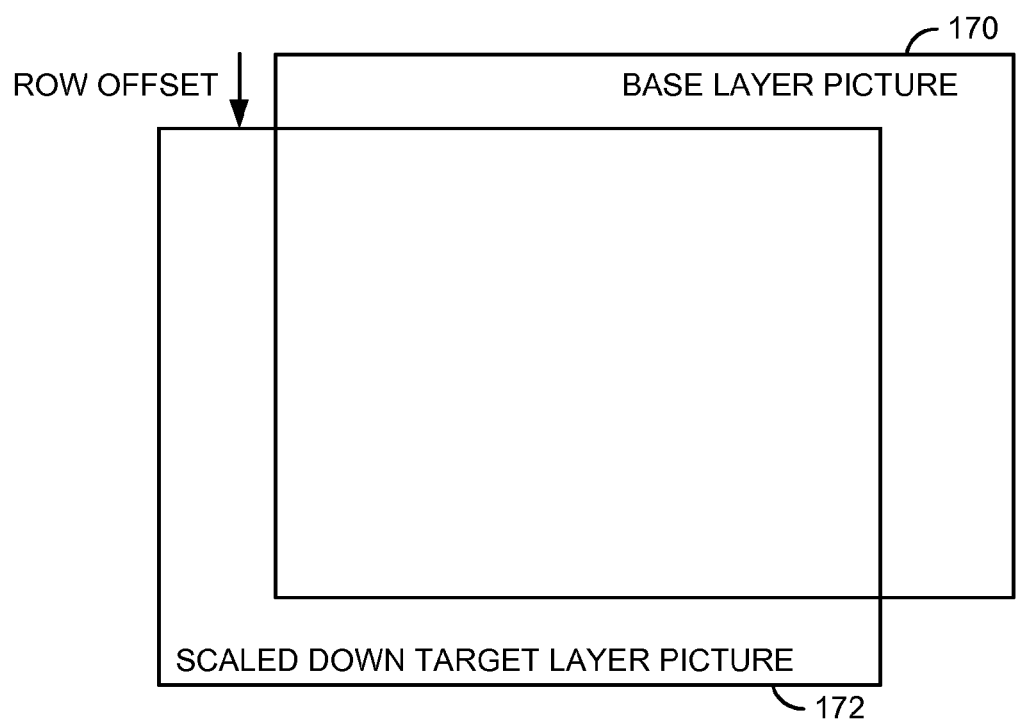
FIG. 5 is a diagram illustrating the relationship between a base layer picture and a scaled down target layer picture.

Referring to FIG. 5, the relationship between a base layer picture 170 and a scaled down target layer picture 172 for a layer switch operation is shown. The target layer picture 172 may be scaled down to the resolution of the base layer picture 170. There may be an offset between the base layer picture 170 and the scaled down target layer picture 172. Since the layer switch operation handles the macroblock-row as a unit, only the row offset is emphasized in FIG. 5. The row offset represents an offset from the top of the base layer picture 170 to the top of the scaled down target layer picture 172.

Figure 6:
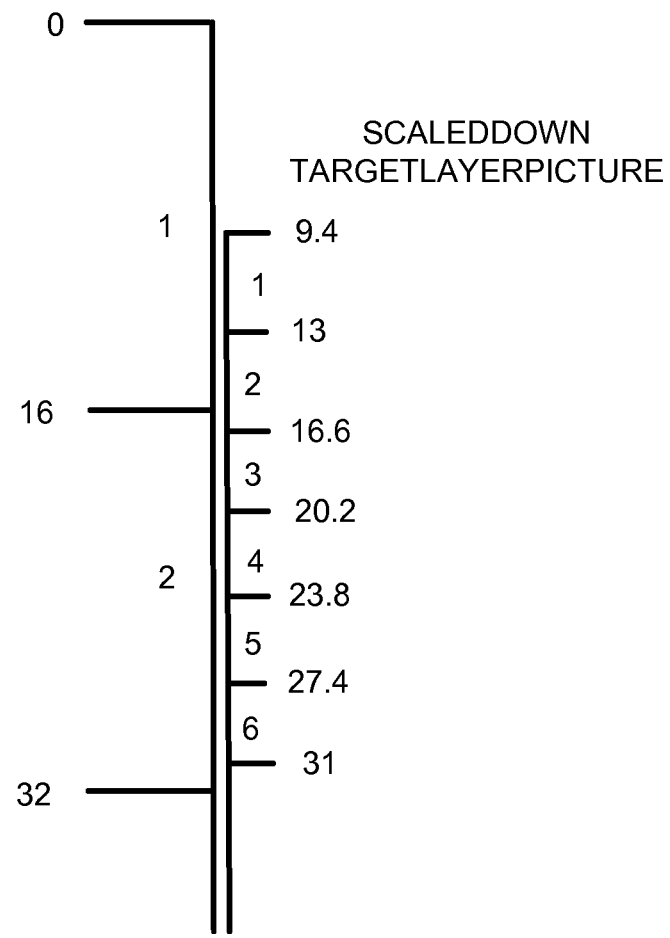
FIG. 6 is a diagram illustrating the layer switching circuit operation with two layers.

Referring to FIG. 6, an example of how the layer switching circuit 110 works for two layers is shown. The layer switching operation is based on a ratio and the row offset. The ratio may be a scaled ratio of the resolution of the base layer divided by the resolution of the target layer. The layer switching circuit 110 may have an mb_row_phase_init configuration and a mb_row_phase_inc configuration. The mb_row_phase_init configuration may include enough integer and fractional bits to cover the row offset accuracy. The mb_row_phase_inc configuration may include enough integer and fractional bits to cover the ratio accuracy. A phase counter may be implemented to track current mb_row_phase. The following example and TABLE 1 illustrates how the phase counter may operate for a two layer implementation:

mb_row_phase_init=9.4
mb_row_phase_inc=3.6
mb_row phase_count=0 at the beginning of a picture.

TABLE 1

| Condition | Operation | result mb_row_phase_count |
|---|---|---|
| mb_row_phase_init != 0 // chropping on the top for BaseLayer. | Decode 1st BaseLayer MBrow | mb_row_phase_count = 16 // advance 16 sample rows in BaseLayer |
| mb_row_phase_count = 16 < (9.4 + 3.6 * 3 = 20.2) // non-cropping area needs to cover at least 3 TargetLayer MBrows | Decode 2nd BaseLayer MBrow | mb_row_phase_count = 16 + 16 = 32 |
| mb_row_phase_count = 32 > (9.4 + 3.6 * 3 = 20.2) // covered 3 TargetLayer MBrows | Decode 1st TargetLayer MBrow | mb_row_phase_count = 32 − 3.6 = 28.4 // each TargetLayer MBrow consume 3.6 |
| mb_row_phase_count = 28.4 > (20.2) | Decode 2nd TargetLayer MBrow | mb_row_phase_count = 28.4 − 3.6 = 24.8. |
| mb_row_phase_count = 24.8 > (20.2) | Decode 3rd TargetLayer MBrow | mb_row_phase_count = 24.8 − 3.6 = 21.2 |
| mb_row_phase_count = 21.2 > (20.2) | Decode 4th TargetLayer MBrow | mb_row_phase_count = 21.2 − 3.6 = 17.6 |
| mb_row_phase_count = 17.6 < (20.2) | Decode 3rd BaseLayer MBrow | mb_row_phase_count = 17.6 + 16 = 33.6 |
| mb_row_phase_count = 33.6 > (20.2) | Decode 5th TargetLayer MBrow | mb_row_phase_count = 33.6 − 3.6 = 30 |
| // continue until reach end of frame for BaseLayer, then finish TargetLayer | | |

Figure 7:
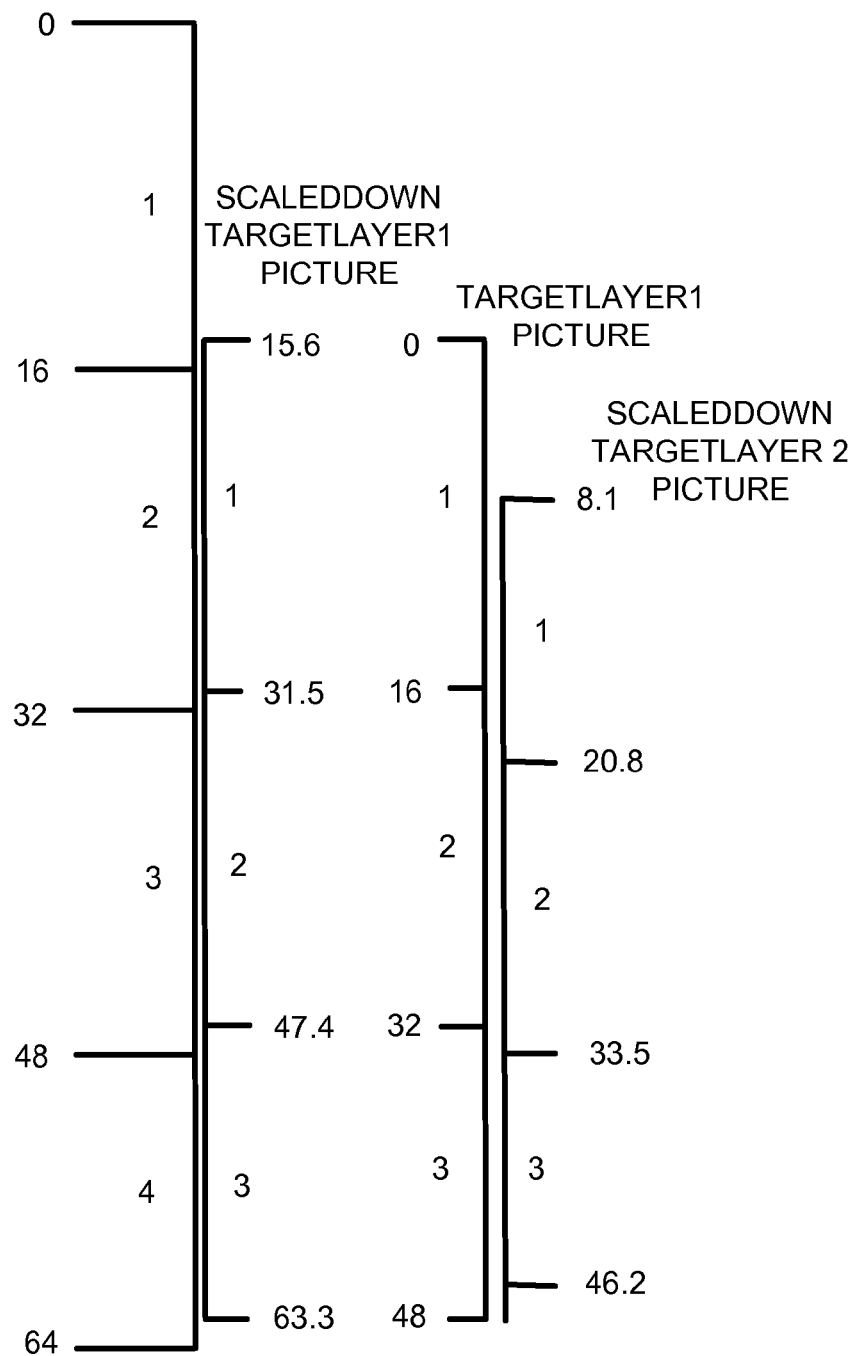
FIG. 7 is a diagram illustrating the layer switching circuit operation with three layers.

Referring to FIG. 7, an example of how the layer switch operation works for three layers is shown. While three layers are shown, the layer switching operation may be extended to more than three layers. The following example and TABLE 2 illustrates how the phase counter works for three layers:

tgt1_mb_row_phase_init=15.6 tgt1_mb_row_phase_inc=15.9 tgt2_mb_row phase_init=8.1 tgt2_mb_row_phase_inc=12.7 tgt1_mb_row_phase_count=0 at the beginning of a picture.

tgt2_mb_row phase_count=0 at the beginning of a picture.

TABLE 2

| Condition | Operation | result mb_row_phase_count |
|---|---|---|
| tgt1_mb_row_phase_init != 0 // cropping on the top for BaseLayer. | Decode 1st BaseLayer MBrow | tgt1_mb_row_phase_count = 16 // advance 16 sample rows in BaseLayer |
| tgt1_mb_row_phase_count = 16 < (15.6 + 15.9 * 3 = 63.3) // non-cropping area needs to cover at least 3 TargetLayer MBrows | Decode 2nd BaseLayer MBrow | tgt1_mb_row_phase_count = 16 + 16 = 32 |
| tgt1_mb_row_phase_count = 32 < (15.6 + 15.9 * 3 = 63.3) | Decode 3rd BaseLayer MBrow | tgt1_mb_row_phase_count = 32 + 16 = 48 |
| tgt1_mb_row_phase_count = 48 < 63.3 | Decode 4th BaseLayer MBrow | tgt1_mb_row_phase_count = 48 + 16 = 64 |
| tgt1_mb_row_phase_count = 64 > 63.3 tgt2_mb_row_phase_init ! = 0 | Decode 1st TargetLayer1 MBrow | tgt1_mb_row_phase_count = 64 − 15.9 = 48.1 tgt2_mb_row_phase_count = 16 |
| tgt1_mb_row_phase_count = 48.1 < 63.3 | Decode 5th BaseLayer MBrow | tgt1_mb_row_phase_count = 48.1 + 16 = 64.1 |

TABLE 2-continued

| Condition | Operation | result mb_row_phase_count |
|---|---|---|
| tgt1_mb_row_phase_count = 64.1 > 63.3<br>tgt2_mb_row_phase_count =<br>32 < (8.1 + 12.7 * 3 = 46.2) | Decode<br>2nd<br>TargetLayer1<br>MBrow | tgt1_mb_row_phase_count =<br>64.1 − 15.9 = 48.2<br>tgt2_mb_row_phase_count = 32 |
| tgt1_mb_row_phase_count = 48.2 < 63.3 | Decode<br>6th BaseLayer<br>MBrow | tgt1_mb_row_phase_count =<br>48.2 + 16 = 64.2 |
| tgt1_mb_row_phase_count = 64.2 > 63.3<br>tgt2_mb_row_phase_count =<br>32 < (8.1 + 12.7 * 3 = 46.2) | Decode 3rd<br>TargetLayer1<br>MBrow | tgt1_mb_row_phase_count =<br>64.2 − 15.9 = 48.3<br>tgt2_mb_row_phase_count = 48 |
| tgt1_mb_row_phase_count = 48.3 < 63.3<br>tgt2mb_row_phase_count = 48 > 46.2 | Decode<br>1st<br>TargetLayer2<br>MBrow | tgt1_mb_row_phase_count =<br>48.3<br>tgt2_mb_row_phase_count =<br>48 − 12.7 = 35.3 |
| tgt1_ph_row_phase_count = 48.3 < 63.3<br>tgt2_mb_row_phase_count = 35.3 < 46.2 | Decode<br>7th BaseLayer<br>MBrow | tgt1_mb_row_phase_count =<br>48.3 + 16 = 64.3<br>tgt2_mb_row_phase_count =<br>35.3 |

// continue until reach end of frame
for BaseLayer and TargetLayer1 then
finish TargetLayer2

Figure 8:
FIG. 8 is a diagram illustrating the cascading of layers in scalable video coding.

Referring to FIG. 8, the cascading of layers in scalable video coding is shown. By decoding the first two layers of the bitstream, the TargetLayerPicture1 may be reconstructed. By decoding the first three layers of the bitstream, the TargetLayerPicture2 may be reconstructed. In one example, up to eight layers may be coded the in bitstream.

The layer-difference coding scheme may be cascaded. After decoding the BaseLayer stream and the TargetLayer1 stream, the result TargetLayerPicture1 information may be used as a new base layer for the TargetLayer2 stream. The TargetLayer2 stream may be the coded TargetLayerPicture2 and the TargetLayerPicture1 difference. By applying TargetLayer2 information to be the base layer of the TargetLayer3, the TargetLayerPicture3 may be reconstructed. In the H.264 Standard, up to eight layers of spatial scalability may be supported.

Figure 9:
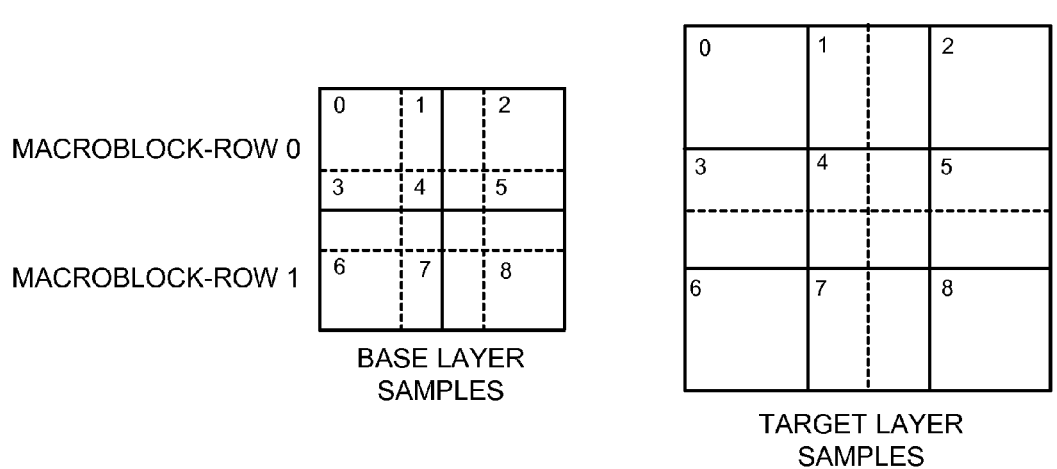
FIG. 9 is a diagram illustrating the macroblock relationship between a base layer and a target layer.

Referring to FIG. 9, the macroblock relationship between a base layer and a target layer is shown. The macroblock relationship between the two layers may be used to determine how many macroblock rows of information in the base layer is needed to decode one macroblock row in the target layer. As shown in FIG. 9, four macroblocks in the base layer picture may be spatially scaled by up to nine macroblocks in the target layer picture. To decode the macroblock-row with macroblock numbers 0, 1, 2 in the target layer, the Macroblock-Row0 in the base layer is needed. To decode the macroblock-row with macroblock numbers 3, 4, 5 in the target layer, the Macroblock-Row0 and the Macroblock-Row1 in the base layer are needed. To decode the macroblock-row with the macroblock numbers 6, 7, 8 in the target layer, only the Macroblock-Row1 in the base layer is needed. When the information for the Macroblock-Row0 is no longer needed, the information may be discarded.

Referring to FIG. 10, an example of a circuit 100' is shown illustrating parallel handling of three layers in hardware. While three layers are show, up to eight layers may be handled in an H.264 implementation. The handling of the BaseLayer Stream, TargetLayer1 Stream, and TargetLayer2 Stream is shown. The BaseLayerCoeeficients, TargetLayer1 Coefficients, and TargetLayer2 Coefficients may be stored in the DRAM memory. Hardware may retrieve the coefficients from the memory. The hardware may then select one coefficient to work on each time in the unit of macroblock-row.

Figure 11:
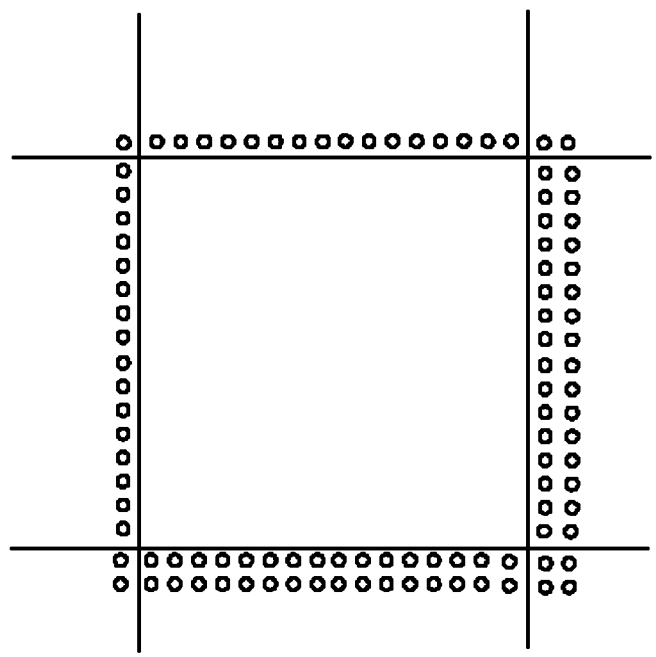
FIG. 11 is a diagram illustrating the samples needed for intra-resampling a macroblock.

Referring to FIG. 11, the samples needed for intra-resampling a macroblock is shown. Intra-resampling is a 4-tap filter. One extra column on the left, one extra row on the top, two extra rows on the bottom, and two extra columns on the right is needed.

Since the base layer samples need to go through the intra-resampling process to be used in the target layer, and intra-resampling is a four-tap filter, extra rows and columns are needed for each macroblock. In a worst case scenario, three macroblock rows of the base layer information is needed. Up to eight layers, which is specified in the H.264 standard, and a three macroblock-row memory space is needed for each layer below.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
    a decoder circuit configured to generate a first intermediate signal having a plurality of coefficients of a target layer and a plurality of coefficients of a base layer, in response to an input bitstream;
    a memory circuit configured to (i) store said first intermediate signal and (ii) present (a) a second intermediate signal comprising said plurality of coefficients of said target layer and (b) a third intermediate signal comprising said plurality of coefficients of said base layer; and
    a processing circuit configured to (i) read said second intermediate signal and said third intermediate signal from said memory circuit, (ii) switch a plurality of times between said coefficients of said target layer and said coefficients of said base layer while reading a frame from said memory circuit, (iii) transform said coefficients of said base layer into base layer information, (iv) buffer said base layer information, wherein said base layer information buffered at any time comprises at most a subset of macroblock rows of said frame and (v) generate an output signal comprising a plurality of target layer samples in response to said second intermediate signal and said base layer information as buffered.

2. The apparatus according to claim 1, wherein said processing circuit comprises a second memory circuit configured to store and/or retrieve base layer information.

3. The apparatus according to claim 2, wherein said memory circuit and said second memory circuit are implemented on a single integrated circuit.

4. The apparatus according to claim 1, wherein said processing circuit comprises a layer switching circuit configured to select between said second intermediate signal and said third intermediate circuit.

5. The apparatus according to claim 1, wherein said processing circuit comprises a transform circuit configured to generate said target layer samples from said plurality of coefficients.

6. The apparatus according to claim 1, wherein said processing circuit comprises a multiplexer circuit.

7. The apparatus according to claim 1, wherein said decoder circuit decodes said bitstream in a macro-block row format.

8. The apparatus according to claim 1, wherein said decoder circuit starts decoding highest resolution layers before all lower resolution layers are completely decoded.

9. An apparatus comprising:
means for generating a first intermediate signal having a plurality of coefficients of a target layer and a plurality of coefficients of a base layer, in response to an input bitstream;
a memory circuit configured to (i) store said first intermediate signal and (ii) present (a) a second intermediate signal comprising said plurality of coefficients of said target layer and (b) a third intermediate signal comprising said plurality of coefficients of said base layer; and
means for (i) reading said second intermediate signal and said third intermediate signal from said memory circuit, (ii) switching a plurality of times between said coefficients of said target layer and said coefficients of said base layer while reading a frame from said memory circuit, (iii) transforming said coefficients of said base layer into base layer information, (iv) buffering said base layer information, wherein said base layer information buffered at any time comprises at most a subset of macroblock rows of said frame and (v) generating an output signal comprising a plurality of target layer samples in response to said second intermediate signal and said base layer information as buffered.

10. A method for implementing scalable video coding, comprising the steps of:
(A) generating a first intermediate signal having a plurality of coefficients of a target layer and a plurality of coefficients of a base layer, in response to an input bitstream;
(B) storing said first intermediate signal in a memory circuit;
(C) presenting (a) a second intermediate signal comprising said plurality of coefficients of said target layer and (b) a third intermediate signal comprising said plurality of coefficients of said base layer;
(D) reading said second intermediate signal and said third intermediate signal from said memory circuit;
(E) switching a plurality of times between said coefficients of said target layer and said coefficients of said base layer while reading a frame from said memory circuit;
(F) transforming said coefficients of said base layer into base layer information;
(G) buffering said base layer information, wherein said base layer information buffered at any time comprises at most a subset of macroblock rows of said frame; and
(H) generating an output signal comprising a plurality of target layer samples in response to said second intermediate signal and said base layer information as buffered.

11. The method according to claim 10, wherein step (D) comprises:
selecting between said second intermediate signal and said third intermediate signal using a layer switching circuit.

12. The method according to claim 10, wherein said step (D) comprises:
generating said target layer samples from said plurality of coefficients using a transform circuit.

13. The method according to claim 10, wherein step (D) comprises using a multiplexer circuit.

14. The method according to claim 10, wherein step (A) decodes said bitstream in a macro-block row format.

15. The method according to claim 10, wherein said decoder circuit starts decoding highest resolution layers before all lower resolution layers are completely decoded.

* * * * *